Figure 1:
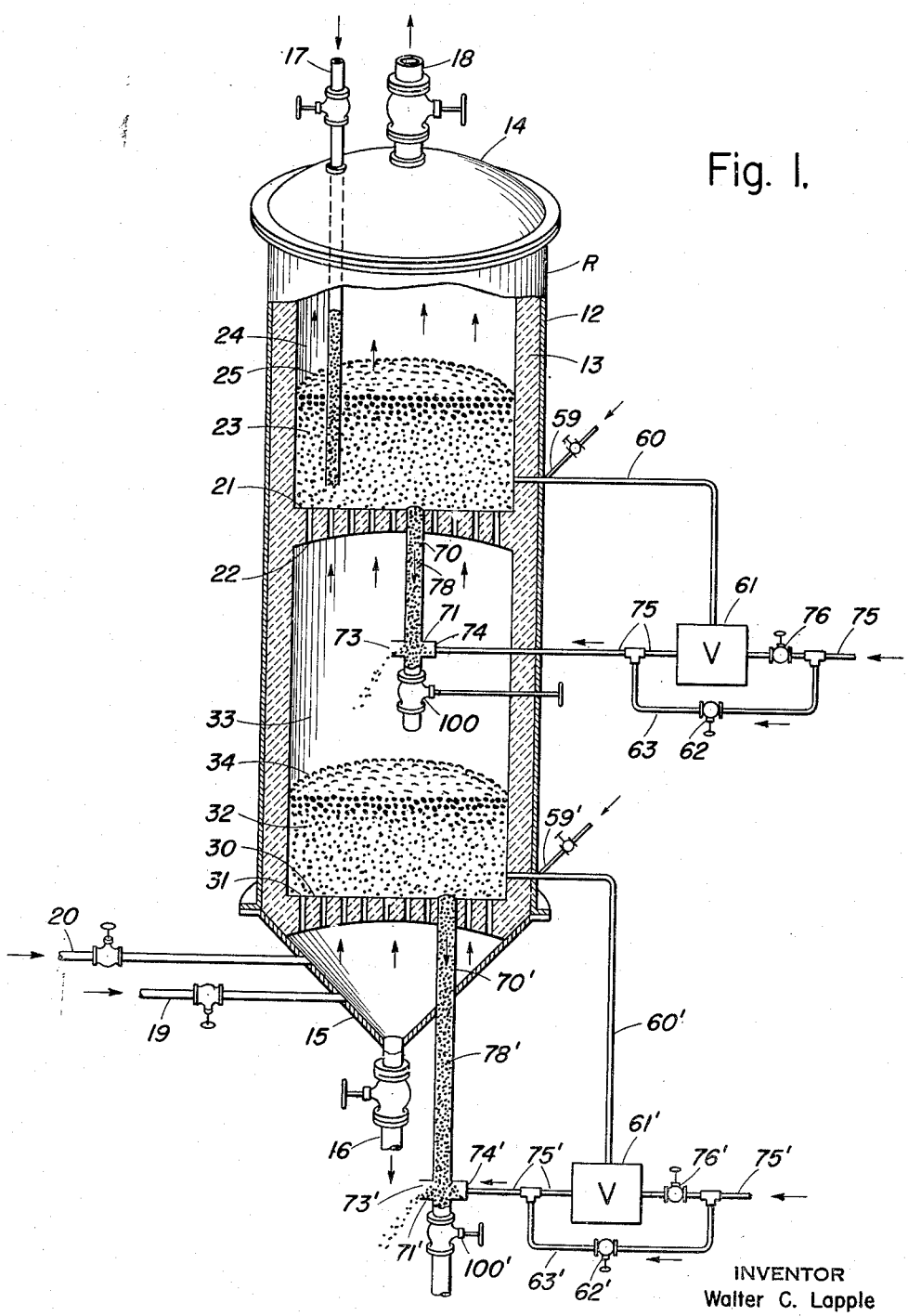

July 27, 1954 — W. C. LAPPLE — 2,684,869
HANDLING PULVERULENT MATERIALS
Filed May 21, 1951 — 2 Sheets-Sheet 1

Fig. I.

INVENTOR
Walter C. Lapple
BY
Arthur Middleton
ATTORNEY

Patented July 27, 1954

2,684,869

UNITED STATES PATENT OFFICE 2,684,869

HANDLING PULVERULENT MATERIALS

Walter C. Lapple, Westport, Conn., assignor to The Dorr Company, Stamford, Conn., a corporation of Delaware Application May 21, 1951, Serial No. 227,433

1 Claim. (Cl. 302—17)

This invention relates generally to the art of handling finely divided solids and particularly to ways and means for controllably flowing such solids from an upper to a lower level through a generally vertical tube. More particularly it relates to ways and means for controllably flowing such solids feedingly into or dischargingly out of vessels of any sort such as enclosed reactors, storage containers, solids transport conduits, and the like.

In handling finely divided solids whereby they are introduced into or discharged from vessels, use is made of a vertical standpipe through which the solids flow; and their rate of flow is controlled by the use of restrictive devices such as slide valves, cone valves, screw conveyors and the like located in or attached to the flow line. However, such methods and devices are not satisfactory because of high initial cost and high maintenance expense. Moreover, such devices plug very easily and are only difficulty accessible for clean out. Further, such devices, being mechanical in structure and having moving parts, are subject to severe erosion when used for controlling the flow of hot solids and consequently require frequent repair or replacement. Moreover, such devices make no provision for minimizing dust losses during such solids-transferring operations.

So it is one object of this invention to provide inexpensive reliable ways and means for controllably flowing finely divided solids through a generally vertical tube such as a standpipe from an upper to a lower level while minimizing dust losses during such operation. Such ways and means will be simple of construction and operation yet will provide a solids flow control device that has long wearing qualities even though it is used to control the flow of hot solids.

The foregoing, and possibly other objects are attained by providing a flow controlling device in which there are no moving parts and which causes the gravity flow of solids through a standpipe through the medium of a small quantity of solids-motivating gas which overcomes the resistance of the solids to flow; such resistance to flow being defined by the angle of repose which the solids assume when not flowing.

Broadly stated, this invention contemplates controllably flowing finely divided solids from an upper to a lower level through a generally vertical standpipe and proposes to accomplish this by feeding such solids into a generally vertical tube having a lower laterally extending offset discharge to establish and maintain therein a column of such solids which is prevented from flowing by the angle of repose assumed by the solids in the discharge. Solids-motivating gas is supplied to the lower section of the zone to pass through such lower section and exit from the discharge in an amount sufficient to overcome the resistance of the solids therein causing them to expel from the discharge. The rate at which solids expel from the discharge varies directly with the quantity of gas exiting from the discharge. Thus the control feature resides in regulating the quantity of gas passing through the discharge.

Summarizing, this invention contemplates feeding finely divided solids into an open-ended columnar solids-discharging conductor terminating at its lower end in a solids-supporting offset discharge to establish and maintain therein a column of such solids adapted to assume a non-flowing angle of repose at such discharge, supplying gas to such zone at the discharge end thereof to pass through the solids and exit from the discharge thus causing solids to flow from the discharge, and controlling the rate at which solids flow from the discharge by regulating the rate at which gas is supplied to the zone.

Otherwise stated, there is provided a generally vertical tube having an open-ended solids receiving top and a lower terminal-end beneath which is a solids-supporting offset discharge; solids fed to the top of the tube emit from the terminal-end thereof to form a column of such solids supported from the offset discharge and extending upwardly into the tube. When in repose the emitted solids are non-flowing; in short they assume a non-flowing angle of repose in the discharge. Solids motivating gas is supplied to the tube at a velocity sufficient to overcome the tendency of the solids to remain in repose thus displacing them from the support and deflecting them through the discharge.

According to this invention, the solids in the columnar zone are in a dense compact state and provide a gas-seal for preventing undesirable gas leakage through the zone. If feed to the zone ceases, then discharge therefrom can be halted by stopping the supply of motivating gas to the zone. If a gas-seal is desired during feed stoppage then the motivating gas supply is halted while sufficient solids remain in the tube to provide the required seal.

The operating limits of this invention may be defined as lying between that point where no solids flow from the discharge and that point at which the rate of solids discharge is substantially equal to the rate at which such solids would flow through an unobstructed columnar zone or standpipe.

Otherwise stated, when the gas supply stops and the column of solids is at rest then the angle of repose assumed by the solids at the discharge prevents them from flowing and therefore none will flow; in other words, a zero solids-flow rate is the lower limit. On the other hand, if the solids were permitted to flow through an unobstructed columnar zone being propelled therethrough by gravitational force alone or by gravitational force in combination with other forces, then the maximum rate of solids flow under such conditions will define the upper operating limit. In other words, the upper limit is established by the rate at which solids are supplied to the discharge end of the columnar zone.

Within these operating limits then, the rate of solids discharge from the columnar zone is controlled by the rate at which solids-motivating gas is supplied to the discharge end of the zone for causing the solids to flow by overcoming their resistance to flow. In other words, within the defined limits, the rate at which solids flow through the columnar zone to spill from the discharge end thereof is controlled by regulating the quantity of motivating gas supplied to the zone.

It is to be noted that the solids in the columnar zone standpipe or flow line are in a dense phase. That is, they are resting compactly within the standpipe and are not turbulently mobilized therein. It is also noteworthy that the quantity of motivating-gas admitted to the discharge end of the standpipe is just sufficient to effect the desired rate of gravity-flow discharge. This quantity will vary according to the type of solids being handled and the desired rate of flow; however, its low order is to be contrasted with the higher quantities of gas commonly used in solids transport lines wherein the solids are transported through conduits as entrained solids.

As this invention may be embodied in several forms without departing from the spirit or essential characteristics thereof, the present embodiment is therefore illustrative and not restrictive, since the scope of the invention is defined by the appended claim rather than by the description preceding it, and all changes that fall within the metes and bounds of the claim, or equivalents of such metes and bounds, are therefore intended to be embraced by this claim.

Figure 2:
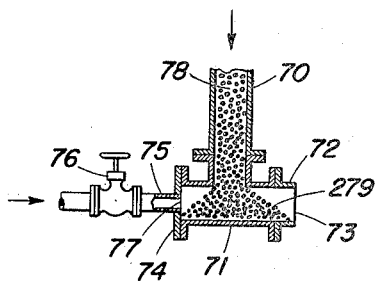
Figure 3:
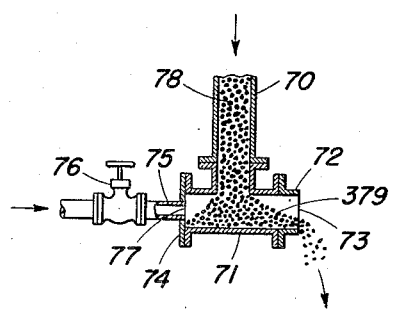
Figure 4:
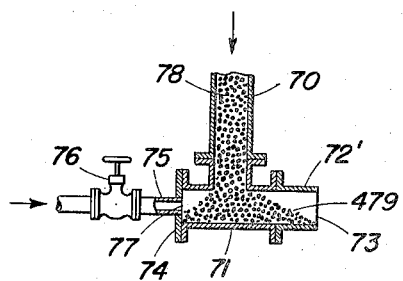
Figure 5:
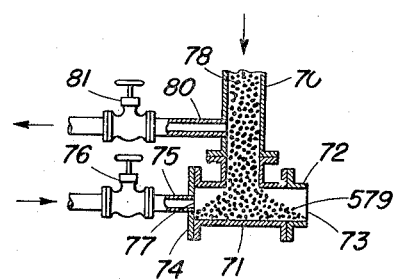

In the drawings, Figure 1 shows a preferred embodiment of this invention in association with a multi-chambered fluidized solids reactor. Figures 2 and 3 are detailed drawings showing an embodiment of the invention similar to the embodiments shown in Figure 1. Figures 4 and 5 are detailed drawings of an embodiment of this invention adapted for discharging solids from pressured vessels.

Since Figure 1 shows an embodiment involving a fluidized solids reactor, it will be advisable to discuss briefly the general nature and operation of such reactors in solids fluidizing operations.

In general, in the fluidized bed technique for treating solids a bed of subdivided solid particles is maintained as a dense homogeneous suspension behaving like a turbulent liquid and exhibiting a fluid level. This is accomplished by passing through the bed an uprising stream of gas at a velocity sufficient to considerably expand the depth of the bed as well as to maintain its particles in turbulent suspension in the uprising gas stream, but at a velocity insufficient to cause the gas to entrain and carry out of the reactor any substantial quantity of solid particles. Under such conditions the bed is called a fluidized bed. The fluid level of this fluidized bed is maintained by the use of a solids discharge arrangement so that as more solid particles are introduced into the bed the resulting increased depth causes the particles to flow from the bed just as a fluid does.

In a reactor having a plurality of zones, several superposed beds are simultaneously maintained in such a fluidized state. Each fluidized bed is usually a separate distinct treatment stage. The treated solid particles from a superjacent bed are discharged to a subjacent bed for further treatment, then to the next subjacent bed for even further treatment, etc. This process continues until the particles have passed through all of the fluidized beds after which they are discharged from the reactor.

Due to the turbulence within fluidized beds, heat exchange by and among the particles thereof is almost instantaneous so that if two portions of particles, each at a different temperature from the other, are commingled in a fluidized bed the resulting mixture will almost instantly assume a temperature intermediate the temperatures of the portions commingled. Further, this rapid heat exchange creates a substantially uniform temperature throughout the bed.

In Figure 1 the reactor R is a vertical cylinder having a metal outer wall 12 and lined with refractory material 13. The reactor has a top 14 and a coned bottom 15 provided with a valved outlet 16. Solids to be treated enter the reactor through valved conduit 17 while exhaust gas exits from the reactor via valved conduit 18. Fluidizing gas enters via valved conduit 19 while fuel, if needed, is introduced via valved conduit 20 and combusted in a burner not shown. Located within the reactor, extending throughout its cross-sectional area and adapted to hold fluidized beds of solids being treated are perforated constriction plates 21 and 30 holding fluidized beds 23 and 32 respectively, above which are free-board spaces 24 and 33 respectively.

Standpipe or tube 70 is provided to discharge solids from bed 23 into bed 32. Standpipe 70 has a short laterally extending section 71 having an open end 73, a gas entry point 74 and a clean-out valve 100. Gas enters section 71 at point 74 via conduit 75.

Solids leaving bed 23 flow into standpipe 70 and form therein a column of solids 78, which normally rests in repose in section 71. Gas admitted at 74 disturbs this repose and causes solids to spill from open end 73 of section 71. The rate at which solids spill from section 71 is controlled by regulating the rate at which gas is admitted at 74 to pass through section 71 and out open end 73.

The rate at which gas enters at 74 is controlled by regulating valve 61 located in gas supply line 75. Pressure tap 60, provided with valved purge-gas inlet 59 for keeping line 60 free of plugging solids, leads from fluidized bed 23 to gas-flow regulating station 61. Flow regulating station 61 regulates the quantity of solids-motivating gas supplied to section 71. Station 61 comprises a pressure-actuated controller such as a Foxboro controller, Model 40, illustrated on page 52 of Foxboro bulletin No. 450, in combination with a Foxboro flow control valve such as illustrated on page 75 of Foxboro bulletin No. 450.

Pressure variations within bed 23 are transmitted to flow regulating station 61 via pressure tap 60 and such variations actuate the pressure-actuated controller which in turn actuates the flow-control valve. Thus, the rate at which solids are expelled from section 71 is automatically regulated by pressure variations within bed 23; and since a constant bed depth insures substantially constant pressures within such bed the bed depth will be automatically regulated to remain substantially constant by the apparatus arrangement described.

If manual control of solids discharge rate is desired then valve 76 is closed and valve 62 is opened and gas is supplied through by-pass conduit 63 at a desired rate selectively regulated by manipulation of valve 62. In this manner bed 23 can be completely discharged or can be allowed to build up to greater or lesser depth as desired.

Solids being discharged from bed 32 flow downwardly into standpipe 70' to form a dense non-fluidized column of solids 78' therein. Subtended to standpipe 70' is section 71' which has an open end 73', a clean-out valve 100' and gas-inlet at 74'. Gas enters at 74' via conduit 75' and the rate at which gas is supplied is controlled either by manual valve 62' in by-pass conduit 63' or by gas flow control station 61' actuated by pressure tap 60' as described in connection with station 61, supra. Pressure tap 60' is provided with a valved purge-air line 59' which serves to keep pressure tap 60' freed from solids. When the reactor is in operation, solids enter bed 23 via conduit 17 and are either treated or preheated in that bed while being maintained in a fluidized condition by uprising fluidizing gases. Bed 23 exerts a pressure on solids within it and solids entering standpipe 70 are densely packed therein due to this pressure. The rate at which solids are discharged out open end 73 of section 71 into freeboard space 33 will depend upon the rate at which solids are fed to bed 23 as well as the type of treatment that they receive. The feed rate is correlated with the desired discharge rate so that a substantially constant bed level is obtained. If it is desired to raise or lower bed level 25, such raising or lowering can be accomplished by decreasing or increasing the gas supply to point 74. If the gas supply decreases the discharge rate decreases and bed 23 will increase in depth.

The rate at which solids flow from section 71 is controlled by the rate at which gas is supplied at 74 and the solids flow rate is substantially unaffected by pressure within either freeboard 33 or bed 23. Moreover, the column of solids 78 prevents gas from freeboard 33 from flowing up standpipe 70 rather than flowing through perforated constriction plate 21 as it should.

Solids to be discharged from bed 32 are flowed through standpipe 70' and out of lower section 71' through open end 73' in exactly the same manner and utilizing similar control methods to those discussed supra in connection with the discharge of solids from bed 23 via conduit 70. Column of solids 78' serves as a seal, thus minimizing the leakage of gases from freeboard space 33 to the atmosphere or from the atmosphere into freeboard space 33.

If desired, conduit 70 can be arranged to lead from bed 23 to a point outside the reactor and discharge section 71 can lead through the reactor wall into freeboard space 33 thus putting the lower end of the discharge device outside of the reactor and permitting ready access for clean-out.

Figure 2 is a detailed drawing showing an open view of an embodiment of this invention. In Figure 2 a tube or standpipe 70 of any suitable material and desired cross-sectional shape is provided to act as a solids flow line. Subtended to standpipe 70 is a T or lateral extent section 71 of any desired material and cross-sectional shape and having an open end 73 as well as a closed end 74 through which flow motivating gas enters at 77. This gas is supplied in controlled amounts via conduit 75 valved as at 76. The lateral extent of section 71 is increased by addition of nipple 72 at open end 73. Solids entering standpipe 70 build up therein a dense column of solids 78. These solids are prevented from flowing by the non-flowing angle of repose which they normally assume in section 71. By angle of repose is meant the acute angle included between solids surface 279 and the bottom of section 71. In Figure 2, no motivating gas is being supplied hence no solids are flowing from open end 73.

Figure 3 is a view similar to Figure 2 except that in Figure 3 motivating gas is being supplied via valved conduit 75 and solids are flowing from open end 73. It may be theorized that the supplied gas disturbs the angle of repose of the solids thus causing them to gravity-flow; the disturbed angle of repose now being defined by the smaller acute angle included between solids surface 379 and the bottom of section 71. The quantity of motivating gas supplied is relatively small and acts as a gravity-flow motivating gas as contrasted with a carrier gas.

Figure 4 shows a modification of the invention for use in discharging solids from containers that are under substantial gas pressure. Figure 4 is similar to Figure 2 except that, in Figure 4, nipple 72' is longer than the corresponding element of Figure 2. This increased length is to insure the cessation of solids flow when the motivating gas supply is cut off. The extra length is necessary because when a substantial gas pressure exists in the vessel being discharged and column of solids 78 is of insufficient height to act as a seal then some gas may leak down through solids column 78 to disturb the solids angle of repose and cause them to flow. This modification is to be employed when a gas pressured vessel is being discharged and space limitations prohibit the use of a standpipe 70 that is of sufficient length to prevent gas leakage through the solids column within it.

Figure 5 shows a further modification of the invention adapted for use in association with discharging solids from pressurized vessels. Figure 5 is similar to Figure 2 except that in Figure 5 a gas bleed-off line 80, valved as at 81 is provided to bleed off any gas that may be entrapped in solids column 78 thus when valve 81 is open and gas supply valve 86 is closed no solids can flow from open end 73. In other words, when solids being fed to the standpipe contain entrapped gas, then such gas can be bled off through conduit 80 in order to prevent obnoxious gas leakage or undesired solids flow.

*Example*

In laboratory tests a 1" inside diameter standpipe was used as a solids flow line. Subtended to the standpipe was a 1¼" inside diameter T section having a closed end into which a ¼" conduit entered for supplying motivating gas. At the open end of the T was a 1¼" short nipple. Sand of average particle size between plus 40 and −20 Tyler screen mesh was continuously fed to the top of the standpipe and the rate at which the sand flowed from the open end of the T was controlled by regulating the quantity of gas supplied through the gas supply line. Air was used as the motivating gas.

Operating under the above conditions the following results were obtained:

| Motivating gas C. F. M. (Air at 20° C. and 1 atmosphere) | Solids flow rate pounds per minute |
| --- | --- |
| 0 | 0 |
| 0.6 | 2.1 |
| 0.75 | 5.0 |
| 0.90 | 9.3 |
| 1.00 | 12.8 |
| 1.10 | 16.8 |
| 1.25 | 26.4 |

I claim:

Apparatus for controllably passing finely-divided solids downwardly through a substantially vertical tube, which comprises an open-ended columnar solids-holding conductor terminating at its lower end in a horizontally directed solids supporting discharge, a valved gas inlet for admitting gas to the columnar conductor in the region of the discharge to pass outwardly through the discharge, said columnar conductor being adapted to hold a column of solids and said discharge being adapted to just contain the base of said column of solids when gas is not being admitted through the gas inlet; and a valved gas-discharge conduit located in the solids-holding conductor at a point above the gas-injection inlet, whereby gases entrapped in the incoming solids can be released therefrom before such solids are emitted from the horizontally directed discharge.

References Cited in the file of this patent

UNITED STATES PATENTS

| Number | Name | Date |
| --- | --- | --- |
| 494,274 | Kalley | Mar. 28, 1893 |
| 1,032,115 | Cook | July 9, 1912 |
| 1,846,069 | Schaub | Feb. 23, 1932 |
| 1,880,452 | Hulslander | Oct. 4, 1932 |
| 1,935,843 | Goebels | Nov. 21, 1933 |
| 2,576,504 | England | Nov. 27, 1951 |
| 2,609,249 | Winter | Sept. 2, 1952 |

FOREIGN PATENTS

| Number | Country | Date |
| --- | --- | --- |
| 180,397 | Great Britain | May 11, 1922 |